United States Patent
Brunard et al.

(10) Patent No.: US 7,935,313 B2
(45) Date of Patent: May 3, 2011

(54) DEVICE FOR PRODUCING LIQUID HYDROCARBONS BY FISCHER-TROPSCH SYNTHESIS IN A THREE-PHASE BED REACTOR

(75) Inventors: Nathalie Brunard, Chaponost (FR); Jean-Marc Schweitzer, Villette de Vienne (FR)

(73) Assignees: IFP Energies Nouvelles, Rueil-Malmaison Cedex (FR); ENI S.p.A., Rome (IT)

( * ) Notice: Subject to any disclaimer, the term of this patent is extended or adjusted under 35 U.S.C. 154(b) by 540 days.

(21) Appl. No.: 11/667,858

(22) PCT Filed: Nov. 16, 2005

(86) PCT No.: PCT/FR2005/002849
§ 371 (c)(1),
(2), (4) Date: Sep. 9, 2008

(87) PCT Pub. No.: WO2006/053982
PCT Pub. Date: May 26, 2006

(65) Prior Publication Data
US 2009/0111898 A1 Apr. 30, 2009

(30) Foreign Application Priority Data
Nov. 17, 2004 (FR) .................................... 04 12207

(51) Int. Cl.
*F27B 15/00* (2006.01)
*C07C 17/06* (2006.01)

(52) U.S. Cl. .................... 422/140; 422/631; 518/700

(58) Field of Classification Search .................. 422/140, 422/190; 518/700
See application file for complete search history.

(56) References Cited

U.S. PATENT DOCUMENTS

| | | | | |
|---|---|---|---|---|
| 4,237,011 A | * | 12/1980 | Acosta | 210/237 |
| 5,290,457 A | * | 3/1994 | Karbachsch et al. | 210/792 |
| 5,422,375 A | | 6/1995 | Rytter et al. | |
| 5,811,469 A | * | 9/1998 | Leviness et al. | 518/700 |
| 5,844,006 A | | 12/1998 | Jager et al. | |
| 6,652,760 B2 | * | 11/2003 | Anderson | 210/767 |

FOREIGN PATENT DOCUMENTS

| | | | |
|---|---|---|---|
| AU | 62458 73 A | | 5/1975 |
| EP | 1338320 A1 | * | 8/2003 |
| GB | 2 130 111 A | | 5/1984 |
| GB | 2 403 433 A | | 1/2005 |
| GB | 2 403 728 A | | 1/2005 |

* cited by examiner

Primary Examiner — Walter D Griffin
Assistant Examiner — Natasha Young
(74) Attorney, Agent, or Firm — Millen, White, Zelano & Branigan, P.C.

(57) ABSTRACT

The invention concerns a device for producing liquid hydrocarbons by Fischer-Tropsch synthesis on solid catalyst particles in a three-phase bed reactor, said device being equipped with at least one filter cartridge mounted in a filtering zone inside said reactor, said filter cartridge comprising: a filter for separating the filtrate of the solid catalyst particles, a cylindrical casing, and inner element having the shape of a hollow cylinder open at its ends and mounted substantially coaxial relative to the longitudinal axis of the casing, an annular chamber delimited by the casing and the walls of the inner element, said chamber being designed to collect the filtrate, and a discharge conduit for said filtrate, wherein the walls of the inner element of the filter cartridge are at least partly formed by the filter of the cartridge.

20 Claims, 3 Drawing Sheets

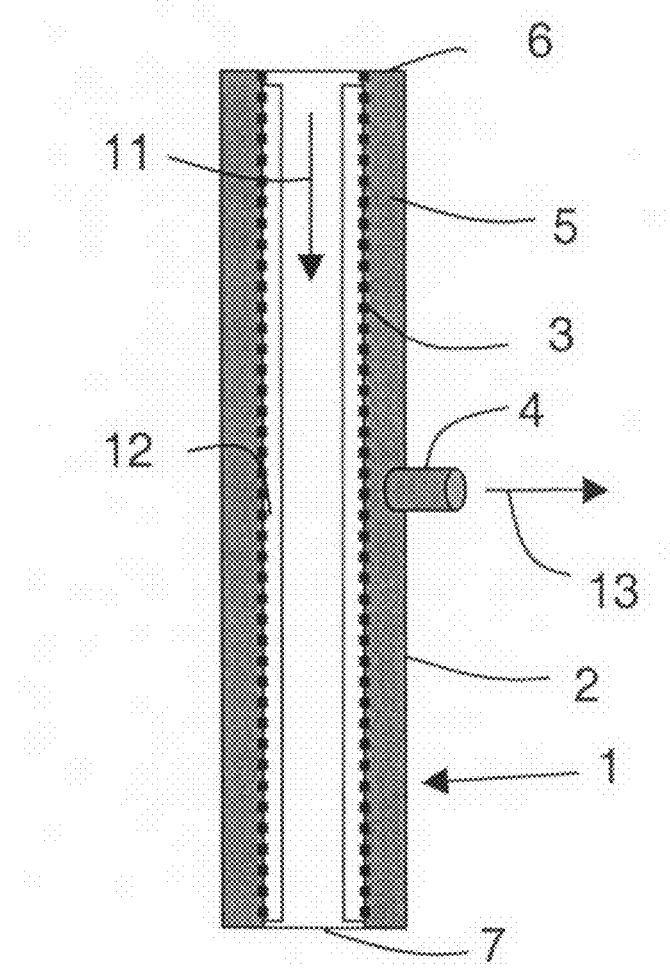
Figure 1.a
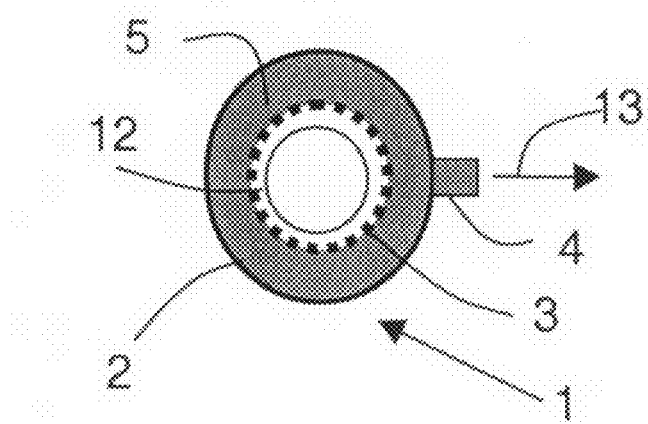
Figure 1.b

DEVICE FOR PRODUCING LIQUID HYDROCARBONS BY FISCHER-TROPSCH SYNTHESIS IN A THREE-PHASE BED REACTOR

FIELD OF THE INVENTION

The invention concerns the field of apparatuses for the production of liquid hydrocarbons by Fischer-Tropsch synthesis which are provided with filtration means for separating the liquid products resulting from the synthesis reaction from the solid catalyst particles. It concerns more particularly an apparatus in which the filtration means are implemented in the actual interior of a three-phase bed reactor.

PRIOR ART

The synthesis of hydrocarbons from a mixture comprising carbon monoxide and hydrogen, more commonly referred to as synthesis gas, has long been known.

Mention may be made in particular of the work of F Fischer and H Tropsch who, as from 1923, gave their name to this chemical transformation which is well-known by the name of Fischer-Tropsch synthesis. Fischer-Tropsch synthesis is a reaction which makes it possible to synthesise liquid paraffinic and olefinic hydrocarbons and/or oxygenated derivatives from a synthesis gas, the latter being obtained for example from natural gas or coal. This reaction which was worked industrially in Europe during the Second World War and also in South Africa from the 1950s met with a spectacular revival in interest from the 1980s to 1990s, following the changes in the cost of petroleum and gas, but also in consideration of environmental aspects.

The production apparatuses used for Fischer-Tropsch synthesis generally comprise means for separating the liquid synthesis product from the catalyst which occurs in the form of solid particles.

U.S. Pat. No. 5,844,006 describes a process for the production of a liquid by the reaction of a gas over a catalyst held in suspension by that liquid in a reactor of the bubble column type, more commonly known by the English expression 'slurry bed reactor', in which the liquid product is separated from the solid catalyst particles by passing the liquid product, in a filtration zone of the bed, through a filtering medium in a first filtration direction so as to form a solid cake of particles on the filtering medium. That patent more particularly describes a sequence involving passing the liquid in the first filtration direction, interrupting the flow of liquid and rinsing by passing a rinsing fluid in a second direction opposite to the first direction.

That patent discloses in particular filter cartridges of a cylindrical shape and comprising a filtering medium comprising a zone for collection of the liquid products. Those cartridges are located in a filtration zone which a priori is disposed anywhere in the reactor.

SUMMARY OF THE INVENTION

An object of the present invention is to provide filtration means using at least one filter cartridge located in the actual interior of the three-phase bed reactor and making it possible to minimise and indeed eliminate the formation of a cake of solid particles at the surface of the filter.

Another object of the invention is to take advantage of the flow conditions within a three-phase bed to improve operation of the filter cartridges and in particular maximise erosion of the cake of solid particles, which is possibly formed at the surface of the filter.

Another object of the invention is to stabilise the flow rate of filtrate passing through the filters.

An object of an embodiment of the invention is to optimise the compromise between maximising the filtration surface area and minimising the amount of space occupied by the filter cartridges in the three-phase bed.

The invention therefore concerns an apparatus for the production of liquid hydrocarbons by Fischer-Tropsch synthesis, on solid catalyst particles, in a three-phase bed reactor, said apparatus being provided with filtration means intended to separate a filtrate from said solid catalyst particles by means of at least one filter cartridge disposed in the three-phase bed. The or each of the filter cartridges of the invention is of an improved configuration whereby the apparatus attains at least one of the aforesaid objects.

A preferred embodiment of the apparatus of the invention relates to specific positioning of the or each cartridge in the interior of the reactor, imparting to the apparatus additional advantages corresponding to at least one of the aforesaid objects.

The description and the Figures set forth hereinafter make it possible to more clearly illustrate the embodiments of the apparatus according to the invention and set out all of the advantages associated with implementation of the apparatus.

BRIEF DESCRIPTION OF THE DRAWINGS

FIGS. 1a and 1b show in non-limiting manner a simplified embodiment of a filter cartridge of the apparatus according to the invention.

DETAILED DESCRIPTION OF THE INVENTION

Figure 2:
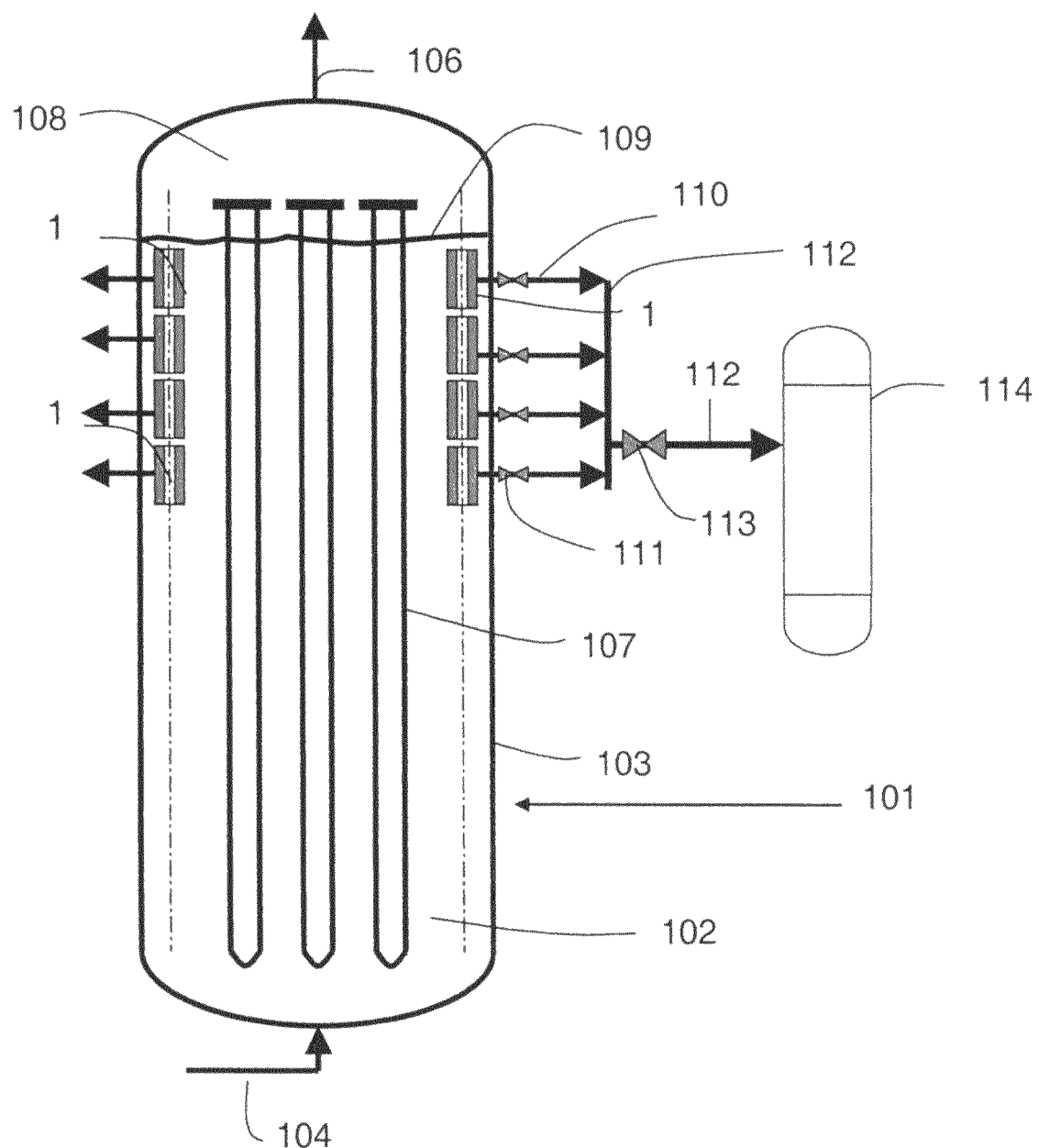
FIG. 2 shows in non-limiting manner an embodiment of the apparatus according to the invention comprising the three-phase bed reactor and the arrangement on four levels of a plurality of filter cartridges within the bed.

The invention therefore relates to an apparatus for the production of liquid hydrocarbons by Fischer-Tropsch synthesis on solid catalyst particles in a three-phase bed reactor, the apparatus being provided with filtration means intended to separate a filtrate from the solid catalyst particles, said means comprising at least one filter cartridge mounted in a filtration zone in the interior of said reactor, the filter cartridge comprising:

a filter intended to separate the filtrate from the solid catalyst particles,
a cylindrical casing,
an internal element in the form of a hollow cylinder open at its ends and mounted in substantially coaxial relationship with the longitudinal axis of the casing,
an annular chamber delimited by the casing and the walls of the internal element, said chamber being intended to collect the filtrate, and
a conduit for discharge of said filtrate.

In the apparatus according to the invention the walls of the internal element of the filter cartridge are at least in part formed by the filter of the cartridge.

In other words the walls of the internal element at least partially constitute the filtering walls of the cartridge.

The term filter is generally used to denote the filtering material or the filtering medium as such, same generally being in the form of a layer or a plurality of layers of materials having the capacity to allow the filtrate to pass and to stop the solid catalyst particles.

The term filtrate is generally used to denote the compounds which pass through the filter, that is to say inter alia the liquid hydrocarbons produced by Fischer-Tropsch synthesis. The filtrate may also include other liquid or gaseous compounds, for example the synthesis gas used as a reactant, as well as possible solid particles which are generally of a size that is very much smaller than the average size of the solid particles of the catalyst bed. The notion of filtrate is intimately linked to the filter used, which may be more or less selective in relation to the compounds of the filtrate.

The filter cartridge of the apparatus of the invention is so configured as to direct the flow of the liquid hydrocarbons and the solid catalyst particles in tangential relationship with the filtering walls of the internal element of the cartridge in such a way that, in the event that a cake of solid particles were to be formed, the seat of such a cake would be the filtering walls of the internal element in the actual interior of the cartridge.

The filter cartridge of the invention can thus be designated as 'internal-external', to stress that the filtrate passes from the interior of the cartridge through the filtering walls of the internal element before being discharged towards the exterior into the annular chamber. That type of cartridge is quite different from that of the prior art, which can be referred to as 'external-internal', that is to say in which the filtrate flows from the exterior of the cartridge, through the filtering walls of the casing thereof, before being discharged towards the interior into a chamber for collecting the filtrate.

By virtue of that 'internal-external' configuration which is specific to the invention, the formation of a cake can be avoided or at least limited, by virtue of the confinement effect which prevails in the interior of the internal element and by virtue of the turbulence generated by the flow conditions prevailing in the filtration zone of the reactor.

That configuration of the filter cartridge also makes it possible to stabilise the flow rate of filtrate in the course of time. Indeed, the absence of formation of a cake, or the limitation in respect of the thickness of the cake, makes it possible to limit the variations in differential pressure across the filter.

In a preferred embodiment of the invention the filter cartridge is positioned in such a way that its longitudinal axis is parallel to the longitudinal axis of the reactor.

In that configuration the circulation of the liquid hydrocarbons and the solid catalyst particles is implemented in substantially tangential relationship with respect to the longitudinal axis of the filter cartridge, which permits the walls of the internal element to be continuously swept. Formation of the cake can be avoided or at least minimised in that way.

In accordance with a still more preferred implementation of the invention the filtration zone corresponds to an annular space in the three-phase bed of said reactor, said annular space being delimited by a radius, defined with respect to the longitudinal axis of the reactor, of between $0.7*R$ and $R$, $R$ being the inside radius of the reactor.

That preferred embodiment makes it possible to maximise the sweeping effect on the filtering walls of the internal element. Indeed, without relying on any theory, it has been noted that the flows of solid particles and liquid hydrocarbons in the periphery part of the three-phase bed are generally descending, and this makes it possible to accelerate the erosion of any cake of solid particles, which would have a tendency to be formed in the interior of the filter cartridge.

That embodiment also makes it possible to optimise the compromise between a maximised filtration surface area and a minimised amount of space occupied by the cartridges in the three-phase bed.

In general terms the flow conditions in the reactor are those of a three-phase bed. The term three-phase bed is used to denote a zone comprising a liquid phase, a gaseous phase and a solid phase, in the present case the catalyst, in which the solid is held in suspension. This may involve for example a fluidised bed or a bubbling bed. This may advantageously be a bed of 'slurry' type, which is more widely known by the English term of 'slurry bed', or a bubble column in which the solid particles are generally distributed over the entire height of the bed.

The apparatus according to the invention generally comprises a plurality of filter cartridges. The number of cartridges can be determined in dependence inter alia on the necessary filtration surface area, the size of the cartridges and the amount of space occupied by those cartridges in the reactor.

Preferably a plurality of filter cartridges is distributed around the longitudinal axis of the reactor, at the periphery of said reactor and at an identical radial position. That positioning makes it possible to ensure identical hydrodynamic conditions around each cartridge. The radius of the position of the cartridges, with respect to the longitudinal axis of the reactor, can be optimised by taking account of the flow speed profiles of the liquid hydrocarbons and the solid particles. It is also possible to envisage distributing the filter cartridges at two or more radial positions around the longitudinal axis of the reactor.

In an embodiment a plurality of stages of filter cartridges are distributed at different levels in the bed of the reactor.

In another embodiment the filter cartridges are distributed over a single level.

In a still more preferred manner the stage or each stage of filter cartridges is disposed in the top part of the bed. The stages of filter cartridges are advantageously disposed in the upper three quarters of the bed, and indeed in the upper half of the bed, or again in the upper quarter of the bed.

Fischer-Tropsch synthesis reactors generally comprise one or more heat exchangers. Those exchangers are preferably tubular. In order to permit dismantling of the arrays of tubes to perform maintenance on those exchangers, it is preferable for the heat exchanger or exchangers to be located along the longitudinal axis of the reactor and for the cartridges to be disposed at the periphery of the three-phase bed of the reactor.

It may be advantageous to locate the filter cartridges in such a way as to minimise any disturbance in the hydrodynamic conditions of the three-phase bed. Preferably the filter cartridges are positioned at the near periphery of the heat exchanger or exchangers. Preferably the spacing between the filter cartridges and the tubes of the exchanger or exchangers is between 1 and 15 cm, preferably between 3 and 10 cm, for example between 5 and 8 cm.

To operate apparatus according to the invention it may be necessary to determine the total filter surface area or total filtration area. That surface area can be determined in dependence on the filtration flow of the filters, namely the flow rate of filtrate per unit of filter surface area.

The filtration flow of the filter cartridges used may vary from 250 to 1000 $l/h.m^2$ (litre per hour and per square metre), preferably from 350 to 700 $l/h.m^2$, more preferably from 400 to 600 $l/h.m^2$.

The filter can be produced from any filtering material known to the man skilled in the art, in particular those which are resistant to a temperature that can range up to 300° C. Preferably the filter is made from one or more materials selected from the group formed by stainless steels or carbon steels. The filter may be made for example of woven wire gauze, sintered or spiral-wound metallic fibres, perforated gauze, gauze of sintered metallic particles, or again porous ceramic.

Those filters can be characterised by a filtration threshold. The choice of the filtration threshold is generally made taking account of the size of the grains of catalyst to be retained. The filtration threshold of the filter is preferably between 1 and 100 μm, more preferably between 5 and 20 μm.

When using the apparatus according to the invention the formation of a cake of solid particles of catalyst on the filtering walls of the internal element is avoided or at least limited by virtue of the erosion generated by the tangential flow of the liquid hydrocarbons and the solid particles along those walls.

The tangential flow speed along the walls of the filter of the internal element can range from 0.5 to 10 metres per second (m/s), preferably from 1 to 7 m/s, more preferably from 2 to 5 m/s.

The solid catalyst particles in the cake, which are deposited on the filtering walls of the internal element, generally do not participate in the Fischer-Tropsch synthesis reaction, and that gives to a reduction in conversion.

When using the apparatus, the proportion of solid catalyst particles in the cake with respect to the totality of the catalyst in the reactor is preferably less than 2%, more preferably less than 1%, still more preferably less than 0.5% by weight.

The catalyst used in the reactor is generally any catalytic solid known to the man skilled in the art, which makes it possible to implement Fischer-Tropsch synthesis. Preferably the catalyst is based on cobalt or iron, more preferably being based on cobalt.

The catalyst used in the reactor is generally a supported catalyst. The support may be for example based on alumina, silica or titanium.

In addition to the filter cartridges the filtration means according to the invention may comprise a conduit for drawing off the filtrate and a receptacle for collecting said filtrate.

An advantage of the apparatus according to the invention is that the filtration means are mounted in the very interior of the reactor, which makes it possible to avoid the use of an external circulation loop, which latter can be the source of blockage, loss of catalyst and catalyst attrition.

Another advantage of the apparatus according to the invention is linked to the stability of the filtrate flow rate and minimisation of the number of rinsing operations or back-flushing operations by circulating a fluid through the filter in the opposite direction to the direction of the filtration procedure.

An additional advantage of the apparatus according to the invention is linked to the reduction in the costs of the assembly of the items of equipment involved in comparison with the systems in the prior art.

DETAILED DESCRIPTION OF THE DRAWINGS

FIGS. 1a and 1b show a filter cartridge 1 of the apparatus according to the invention. FIGS. 1a and 1b are views of the filter cartridge in longitudinal section and cross-section respectively. The cartridge 1 comprises an external casing 2 of cylindrical shape and an internal element 3 which corresponds to a hollow tube open at its ends. The internal element 3 is disposed in coaxial relationship with respect to the casing 2. The cartridge also comprises a discharge conduit 4.

An annular chamber 5 is formed in the space delimited by the walls of the internal element 3 and those of the external casing 2 of the cartridge. The chamber 5 is closed at its two ends 6 and 7.

In this embodiment the filter is formed by the cylindrical walls of the internal element 3.

The liquid hydrocarbons and the solid catalyst particles circulate, by virtue of the three-phase bed flow configuration, towards the interior of the cylinder which is formed by the internal element 3, in a direction represented by the arrow 11. A part of the liquid flow 11 passes through the filter of the wall of the internal element. In the illustrated situation, a cake 12 of solid particles is formed on the filtering walls of the internal element of the cartridge. The non-filtered part of the flow of liquid hydrocarbons as well as the flow of solid particles contribute to erosion of the cake in the very interior of the cartridge, thus limiting the thickness thereof. A filtrate flow 13 is discharged via the chamber 5, by way of the conduit 4.

FIG. 2 shows an embodiment of the apparatus according to the invention comprising a Fischer-Tropsch synthesis reactor 101 with a three-phase bed 102 and an assembly of filter cartridges 1 disposed at four levels within that bed.

The reactor 101 comprises an enclosure 103, a synthesis gas feed conduit 104 and a conduit 106 for discharge of the gases. Tubular heat exchangers 107 are disposed in the interior of the reactor, over the entire height of the reactor. The bed 102 is expanded by the effect of the gas speed. The bed 102 is covered by a gaseous zone 108 which is to be found above the interface 109.

The filter cartridges 1 are disposed at four levels close to the circumference of the reactor 101. Each of the cartridges is equipped with a conduit 110 for discharge of the filtrate from the annular chamber of the cartridge 1 towards the exterior of the reactor 101. The discharge conduits 110 are themselves provided with rapidly opening valves 111. The conduits 110 are connected by way of conduits 112 provided with valves 113 to a receptacle 114 for collecting the filtrate.

The filter cartridges are distributed around a circle which is centred with respect to the longitudinal axis of the reactor, the radius of which is between 0.7*R and R, R being the inside radius of the reactor.

Figure 3:
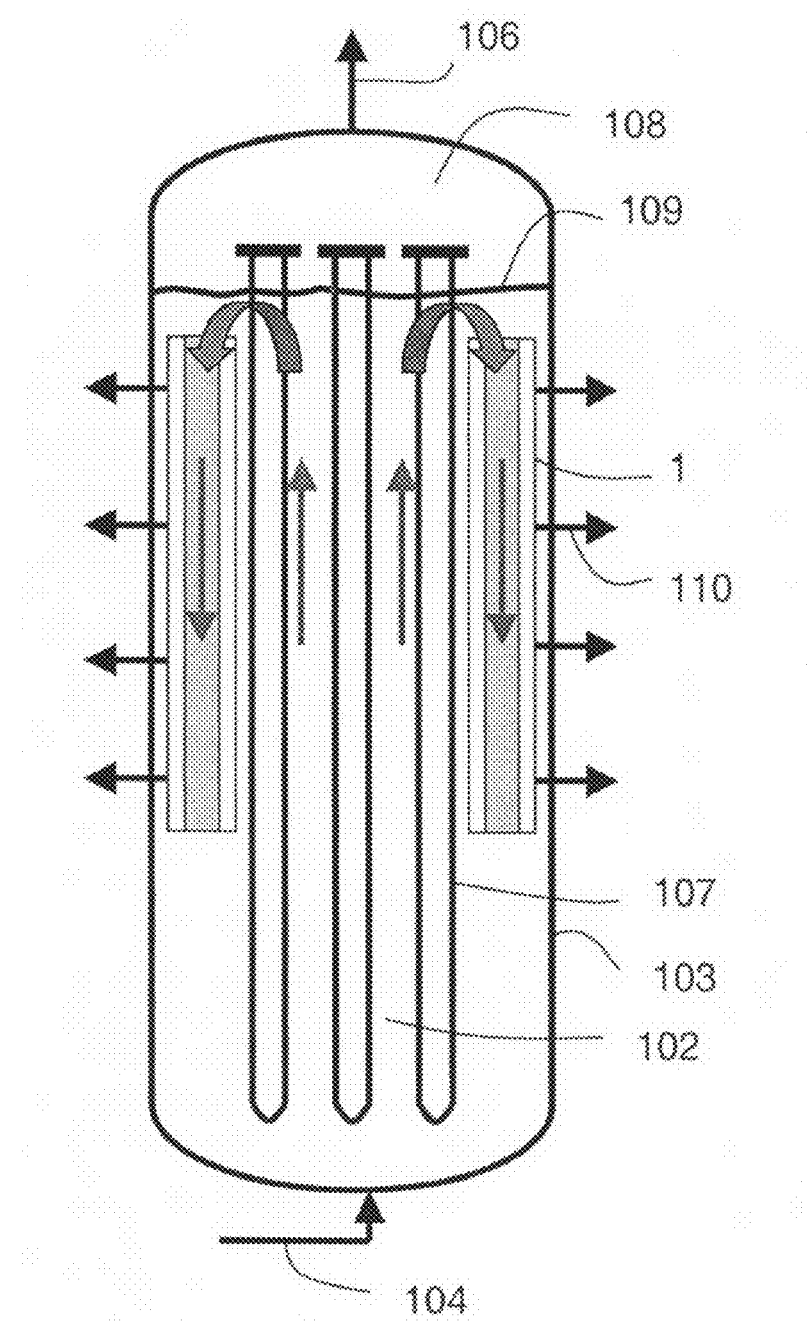
FIG. 3 shows in non-limiting manner another embodiment of the apparatus according to the invention in which the cartridges are disposed on a single level within the three-phase bed.

FIG. 3 shows another embodiment of the apparatus of the invention in which the cartridges are disposed at a single level in the interior of the bed. A large number of the components of FIG. 2 are reproduced and referenced in the same manner.

Example

The performances of the apparatus according to the invention were evaluated from a numerical extrapolation based on the apparatus of FIG. 2 and experiments carried out on a model.

In the experimental part a filter cartridge was tested in a model reproducing most of the flow characteristics in the Fischer-Tropsch synthesis reactor.

The filter cartridge tested in that way is 1 metre in height and 0.07 metre in diameter. The filter used completely covers the cylindrical walls of the internal element of the cartridge or constitutes the essence of those walls. The filter is essentially formed by a stainless steel filtration gauze. The filtration threshold of the filter is between 0.5 and 50 μm.

The tangential flow speed of the liquid fluids and the solid particles, at the level of the internal element of the cartridge, was maintained at between 0.2 and 0.5 m/s. That experiment made it possible to determine the filtration flow of the filter cartridges tested in that way, which is about 0.245 $m^3/h.m^2$ (245 litres per hour and per square metre). That experiment was conducted under conservative conditions by virtue of the fact that the tangential flow speed of the liquid fluids and the solid particles in an industrial reactor is close to 2 m/s, and even beyond that, and that should cause even greater erosion of the possible cake.

That result made it possible to extrapolate to a reactor which is 30 metres in height and 10 metres in inside diameter. For a circulation flow rate of liquid hydrocarbons of 30 tonnes per hour, the reactor is equipped with 817 filter cartridges, this corresponding to a total filtration surface area of 180 m$^2$. Those cartridges are distributed at four levels, in the upper part of the three-phase bed, around a circle which is centred with respect to the longitudinal axis of the reactor and 9.6 metres in diameter. On the same level, the cartridges are spaced at a distance of 0.07 metre. As for the levels, they are spaced relative to each other at a height of 0.3 metre.

Assuming that a cake is formed at the level of each filter cartridge and that the cake formed is of a thickness of between 1 mm and 3 cm, the total mass of catalyst in the cake is between 180 and 5400 kg.

Considering that the mass of catalyst used in a reactor which is 30 metres high and 10 metres wide is about 500 tonnes, the percentage of solid catalyst particles in the cake is between 0.036% and 1.1% by weight. Such percentages have only very little impact on conversion.

The invention claimed is:

1. Apparatus for the production of liquid hydrocarbons by Fischer-Tropsch synthesis on solid catalyst particles in a three-phase bed reactor, the apparatus being provided with filtration means intended to separate a filtrate from the solid catalyst particles, said means comprising at least one filter cartridge mounted in a filtration zone in the interior of said reactor, the filter cartridge comprising:
    a filter intended to separate the filtrate from the solid catalyst particles,
    a cylindrical casing,
    an internal element in the form of a hollow cylinder open at its ends and mounted in substantially coaxial relationship with the longitudinal axis of the casing,
    an annular chamber delimited by the casing and the walls of the internal element, said chamber being intended to collect the filtrate, and
    a conduit for discharge of said filtrate,
wherein the walls of the internal element of the filter cartridge are at least in part formed by the filter of the cartridge.

2. Apparatus according to claim 1 wherein the filter cartridge is positioned in such a way that its longitudinal axis is parallel to the longitudinal axis of the reactor.

3. Apparatus according to claim 2 wherein the filtration zone corresponds to an annular space in the three-phase bed of said reactor, said annular space being delimited by a radius, defined with respect to the longitudinal axis of the reactor, of between 0.7*R and R, R being the inside radius of the reactor.

4. Apparatus according to claim 1 wherein a plurality of filter cartridges is distributed around the longitudinal axis of the reactor, at the periphery of said reactor and at an identical radial position.

5. Apparatus according to claim 1 wherein a plurality of stages of filter cartridges are distributed at different levels in the bed of the reactor.

6. Apparatus according to claim 1 wherein a plurality the filter cartridges are distributed over a single level.

7. Apparatus according to claim 5 wherein a stage of filter cartridges is disposed in the top part of the bed.

8. Apparatus according to claim 1 wherein the reactor comprises one or more heat exchangers.

9. Apparatus according to claim 8 wherein the heat exchanger or exchangers is or are tubular.

10. Apparatus according to claim 8 wherein the heat exchanger or exchangers is or are located along the longitudinal axis of the reactor and the filter cartridges are disposed at the periphery of the three-phase bed of said reactor.

11. Apparatus according to claim 1 wherein the filter cartridges are sized to accommodate a filtration flow which can vary from 250 to 1000 l/.h.m$^2$.

12. Apparatus according to claim 1 wherein the filter comprises stainless steel or carbon steel.

13. Apparatus according to claim 1 wherein the filtration threshold of the filter is between 1 and 100 μm.

14. Apparatus according to claim 1 accommodating a tangential flow speed along the walls of the filter of the internal element of from 0.5 to 10 m/s.

15. Apparatus according to claim 1 comprising wherein a cake of solid particles having a proportion of solid catalyst particles in said cake with respect to the totality of the catalyst in the reactor of less than 2%.

16. Apparatus according to claim 1 wherein the catalyst comprises cobalt or iron.

17. In a process comprising conducting a Fischer-Tropsch synthesis on solid catalyst particles in a three-phase bed reactor, to produce liquid hydrocarbons, the improvement wherein the reactor is in accordance with claim 1.

18. In a process comprising conducting a Fischer-Tropsch synthesis on solid catalyst particles in a three-phase bed reactor, to produce liquid hydrocarbons, the improvement wherein the reactor is in accordance with claim 11.

19. In a process comprising conducting a Fischer-Tropsch synthesis on solid catalyst particles in a three-phase bed reactor, to produce liquid hydrocarbons, the improvement wherein the reactor is in accordance with claim 14.

20. In a process comprising conducting a Fischer-Tropsch synthesis on solid catalyst particles in a three-phase bed reactor, to produce liquid hydrocarbons, the improvement wherein the reactor is in accordance with claim 15.

* * * * *